Figure 1:
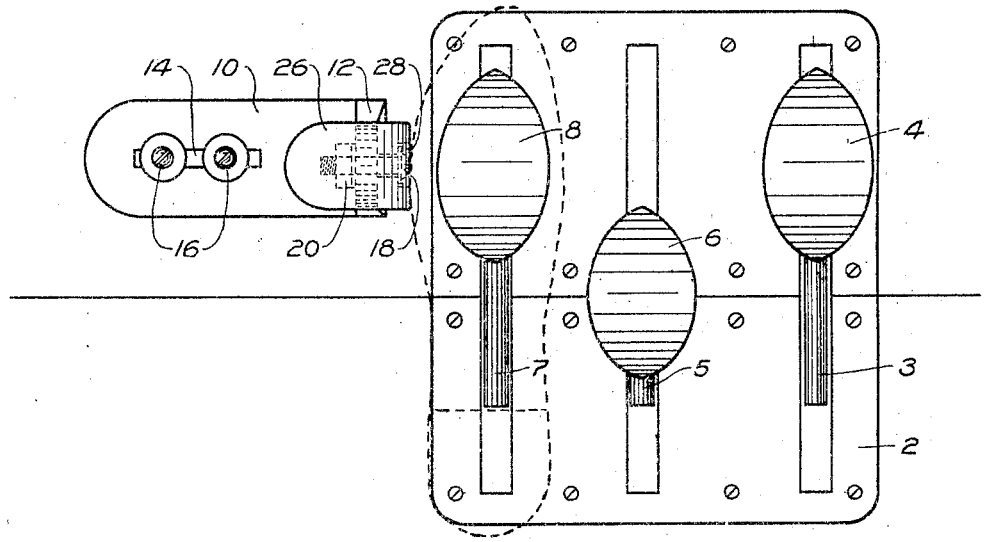

K. K. McLEOD.
STOP DEVICE FOR USE WITH CHANGE SPEED PEDALS OF AUTOMOBILES.
APPLICATION FILED AUG. 2, 1919.

1,381,721.

Patented June 14, 1921.

Inventor:
Kenneth K. McLeod
By Whiteley and Ruckman
his Attorneys

UNITED STATES PATENT OFFICE.

KENNETH K. McLEOD, OF ST. PAUL, MINNESOTA, ASSIGNOR OF ONE-HALF TO WALTER COREY, OF MINNEAPOLIS, MINNESOTA.

STOP DEVICE FOR USE WITH CHANGE-SPEED PEDALS OF AUTOMOBILES.

1,381,721.     Specification of Letters Patent.     Patented June 14, 1921.

Application filed August 2, 1919. Serial No. 314,924.

*To all whom it may concern:*

Be it known that I, KENNETH K. McLEOD, a citizen of the United States, residing at St. Paul, in the county of Ramsey and State of Minnesota, have invented certain new and useful Improvements in Stop Devices for Use with Change-Speed Pedals of Automobiles, of which the following is a specification.

My invention relates to a stop device for use with change-speed pedals of automobiles. The object is to provide a device of this character so that when the brake pedal is depressed to apply the brakes, the change-speed pedal may be depressed from high-speed position into neutral position without danger of the latter pedal being still further depressed into low-speed position at the time when the brakes are set.

The full objects and advantages of my invention will appear in connection with the detailed description thereof and the novel features embodied in my inventive idea are particularly pointed out in the claims.

Referring to the drawings, which illustrate the application of my invention in one form,—

Figure 2:
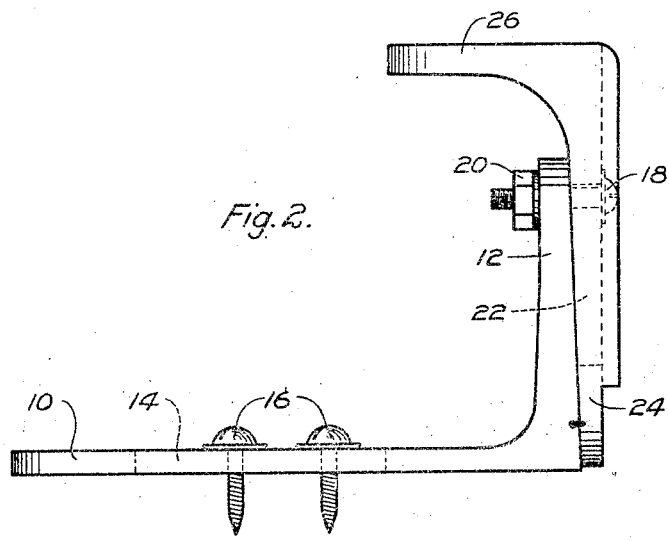

Figure 1 is a top plan view showing my stop device associated with the customary pedals located above the foot-board of an automobile. Fig. 2 is a side view of the stop device.

Referring to the particular construction shown in the drawings 2 represents the customary plate secured to the foot-board of an automobile and which may be divided, as usual, as represented by the horizontal line. The plate and foot-board are provided with three slots, through which extend the levers 3, 5 and 7, upon the upper ends of which are the brake pedal 4, the reverse pedal 6 and the change-speed pedal 8, respectively. The stop device, which constitutes the essential feature of my invention, may be conveniently constructed as follows. A bracket or supporting member has a horizontal portion 10 adapted to be secured to the foot-board and an upwardly-extending arm 12 adapted to be positioned adjacent the pedal 8. The horizontal portion 10 is provided with a slot 14 through which pass bolts or screws 16 which serve to adjustably secure the support or bracket to the foot-board. The upwardly-extending arm 12 is provided near its upper end with a hole, through which extends a bolt 18 having a screw-threaded end for receiving a nut 20. This bolt also passes through a slot 22 in the vertical portion 24 of a stop member having a horizontal foot-engaging portion 26. The portion 24 is preferably provided with a longitudinal recess 28 at the side of or adjacent the slot 22 for receiving the head of the bolt 18 in order that said head may not come in the way of the foot when the device is in use. When the nut 20 is loosened the stop member may be adjusted to the desired height. The member 26 is located adjacent the pedal 8 and may be adjusted to the proper height to act as a stop for the foot when the pedal is moved downwardly from high-speed position and comes into neutral position. In order that the pedal may be depressed still farther and brought into low-speed position, a slight sliding movement of the foot out of its normal position suffices to remove it from contact with the foot-engaging portion 26 so that the foot may move downwardly from the neutral position.

The operation and advantages of my invention will be obvious from the foregoing description. When the driver of an automobile depresses the brake pedal, and also attempts to depress the change-speed pedal from high-speed position into neutral position, there is a tendency for him to continue depressing the latter pedal into low-speed position. The result is that although the brakes are set, the engine continues to drive the automobile with increased power through the low-speed gears, with consequences which are apt to be disastrous. Liability of accidents in this particular is obviated by my stop device.

I claim:

1. A stop device for use with change-speed pedals of automobiles consisting of a support, means for securing said support to the foot-board, and a stop member mounted upon said support, said stop member being adapted to be so positioned as to be engaged by the foot of the driver when the change-speed pedal is depressed from high-speed position into neutral position.

2. A stop device for use with change-speed pedals of automobiles consisting of a support, means for adjustably securing said support to the foot-board, a stop member, and means for adjustably securing said stop member to said support whereby said stop member may be so positioned as to be engaged by the foot of the driver when the change-speed pedal is depressed from high-speed position into neutral position.

3. A stop device for use with change-speed pedals of automobiles consisting of a support, means for adjustably securing said support to the foot-board, said support having an upwardly-extending arm adapted to be located adjacent the change-speed pedal, a stop member provided with a horizontal foot-engaging portion and a vertical portion, said vertical portion being provided with a longitudinal slot and an adjacent longitudinal recess, a bolt extending through said slot and held in position by said upwardly-extending arm, said bolt having its head lying in said recess, and means associated with said bolt for locking said stop member in such position that the foot of the driver will engage said foot-engaging portion when said change-speed pedal is depressed from high-speed position into neutral position.

4. In a device of the character stated, a foot pedal of an automobile for controlling its operation and having an operating and a neutral or off position, combined with an abutment arranged close to one side of the pedal and having its end in position to support the foot of the operator when the pedal is moved to said neutral or off position.

5. In a device of the class described, a clutch pedal adapted to operate a clutch to apply low and high gear transmission respectively in its extreme movements and having a neutral position between said extreme movements and an abutment arranged at said intermediate position to engage the operators foot for locating said position.

In testimony whereof I hereunto affix my signature.

KENNETH K. McLEOD.